F. W. WIGMORE.
GIN TRAP.
APPLICATION FILED SEPT. 4, 1917.
1,256,187.
Patented Feb. 12, 1918.
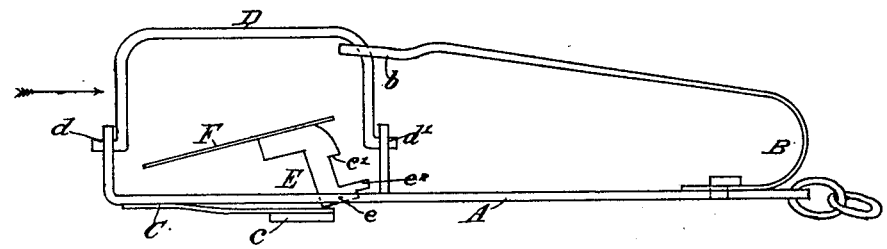
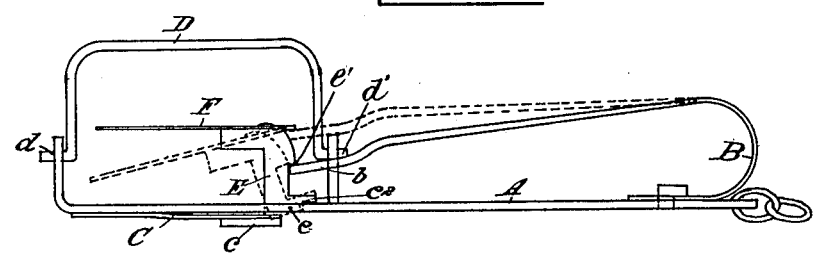
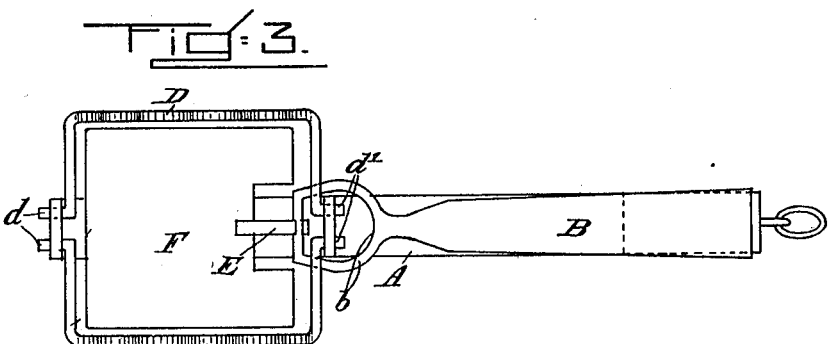
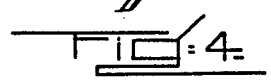
INVENTOR
Frederick Watson Wigmore
By Wm Wallace White
ATT'Y.

UNITED STATES PATENT OFFICE.

FREDERICK WATSON WIGMORE, OF SPOTSWOOD, VICTORIA, AUSTRALIA.

GIN-TRAP.

1,256,187. Specification of Letters Patent. Patented Feb. 12, 1918.

Application filed September 4, 1917. Serial No. 189,590.

*To all whom it may concern:*

Be it known that I, FREDERICK WATSON WIGMORE, subject of the King of Great Britain and Ireland, residing at 23 Hope street, Spotswood, in the State of Victoria, Commonwealth of Australia, have invented new and useful Improvements in Gin-Traps, of which the following is a specification.

This invention relates to improvements in gin-traps that are adapted to catch predatory animals varying in size from a mouse to a fox or wolf. The base of the trap, the spring with an eye to operate the jaws of the gin, and the bait-plate will be constructed in the usual manner, but the mode adopted for setting the gin is entirely novel.

Underlying the base will be a spring having a T head that projects on both sides of the trap thus rendering the trap more stable and less likely to be upset. The arm that carries the bait-plate is pivoted to the base plate at the end adjacent to the spring eye and is provided with a notched tooth that is adapted to engage with the spring eye, when the latter is depressed; this will be effected by placing the foot upon the spring so as to cause the eye to descend; in the meantime the pressure of the foot will depress the base upon the underlying spring which will react against a toe on the bottom of the arm that carries the bait-plate thus causing it to rise and engage the notched tooth with the spring eye, and the trap will be set.

In the accompanying drawings:—

Figure 1 is a side elevation of the gin-trap complete but not set.

Fig. 2 is a side elevation of the same set, but the jaws are still closed.

Fig. 3 is a plan of the trap set with the jaws also in the set position.

Fig. 4 is an end elevation viewed from direction of the arrow.

A is the base to which the main spring B with the eye $b$ is riveted at one end, while, to the other end is riveted the underlying spring C with the T head $c$; the jaws D of the gin are pivoted to the base-plate A at $d$, $d^1$, the jaws being embraced by the eye $b$, in a manner that is well understood. The arm E that carries the bait-plate F is pivoted to the base A at $e$ and is provided with a notched tooth $e^1$, with which the eye $b$ is adapted to engage when it is depressed. The spring B normally assumes an elevated position as shown in Fig. 1, whereby the jaws D are biased, that is forced, into engagement with each other. The spring B will be operated by the foot of the attendant, and, as it is depressed, the forward edge of the eye $b$ will be caused to slide down the incline on the rear edge of the arm E and will engage with the notch-tooth $e^1$. At the same time that the spring B is depressed the base A will be forced down on to the spring C the T head of which will come in contact with the forward toe of the arm E, thus throwing up the bait-plate and placing the notch under the tooth $e^1$ in such a position that the forward end of the eye $b$ shall be adapted to engage, as shown by dotted lines in the drawing. The bait-plate will be prevented from rising too far by the toe piece $e^2$, on the pivoted arm E, which will act as a stop. The jaws D can then be laid open and the bait-plate provided with any suitable bait and the gin-trap will be set. The trap will be sprung by a very slight pressure upon the bait-plate when the eye $b$ will be caused to spring upward, thus closing the jaws and catching the quarry.

I claim—

A trap comprising a base, standards upstanding from said base, jaws pivoted in said standards, a spring biasing said jaws together, a trigger pivoted in said base, and having a notch for receiving the free end of said spring, a lip formed on said trigger and adapted to engage said base to limit the movement of said trigger in one direction, a bait plate secured to said trigger, and a spring secured to the underside of said base and having a relatively large T-shaped head disposed at right angles to said base and adapted to force said trigger toward said first mentioned spring when downward pressure is exerted on said base.

In testimony whereof I have signed my name to this specification in the presence of two subscribing witnesses.

FREDERICK WATSON WIGMORE.

Witnesses:
I. W. REED,
J. SINCLAIR.